H. P. KYNETT.
CULTIVATOR.
No. 192,922. Patented July 10, 1877.
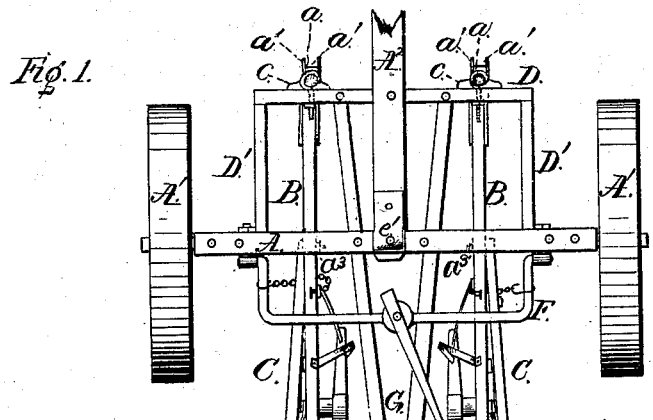
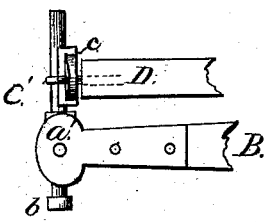
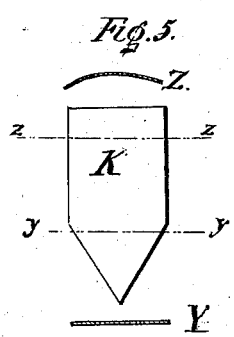
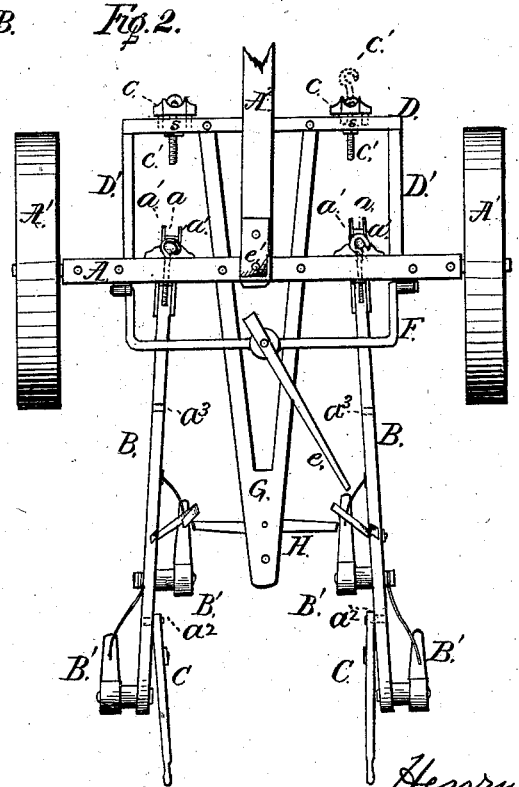
Witnesses:
Walter T. Fowler
G. B. Fowles
Inventor:
Henry P. Kynett
By W. Burris Atty

UNITED STATES PATENT OFFICE.

HENRY P. KYNETT, OF LISBON, IOWA.

IMPROVEMENT IN CULTIVATORS.

Specification forming part of Letters Patent No. 192,922, dated July 10, 1877; application filed June 20, 1877.

*To all whom it may concern:*

Be it known that I, HENRY P. KYNETT, of Lisbon, in the county of Linn and State of Iowa, have invented certain new and useful Improvements in Cultivators; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 is a plan view with the beams and handles attached for a riding-cultivator. Fig. 2 is a plan view with the beams and handles attached for a walking-cultivator. Fig. 3 is a side view of one of the beams, with pivoted socket, connecting-bolt, and bearing. Fig. 4 is a side view of one of the beams with one jaw removed, showing the pivoted socket with bolt inserted. Fig. 5 shows a face view and sectional views of one of the molds.

My invention relates to a cultivator adapted to be used as a riding or a walking cultivator, constructed as hereinafter described.

A represents the axle, $A^1$ the wheels, and $A^2$ the tongue, of the cultivator. B represents the beams, B' the knees or standards, and C C the handles, the forward ends of which handles are bolted to the beams, and the upper parts are supported by braces held by the bolts which fasten the standards to the beams.

D is the front cross-bar, bolted to the tongue and supported by bars D', fastened to the axle. The lever $e$ is pivoted to the bar F, bent at the ends and adjusted in bearings attached to the side of the axle. The forward end of the lever is flattened, and made the proper length to catch over the lug on plate $e'$ when the bar F is raised to support the beams, substantially the same as described in my former patent, granted August 1, 1871, No. 117,547.

G represents a frame, the front part of which is bolted to bar D, and, extending backward under the axle and bolted to it, forms the support for the seat G'.

H is a cross-bar, attached to the back part of the frame G, to support the beams B when moved back to be used as a walking-cultivator, as shown in Fig. 2 of the drawings.

The forward ends of the beams are provided with jaws $a^1$, to hold the pivoted socket $a$, to receive the connecting-bolt $b$.

Bearings $c$, provided with semicircular grooves to receive the connecting-bolts, are attached by eyebolts $c'$ to the bar D or to the axle A, and these bearings are held from turning on the bolts by lugs $s$ on their inner sides entering into holes in the bar or axle, as shown by dotted lines in Fig. 2.

The bar D and the axle A are each provided with the requisite holes to receive the bolts $c'$ and lugs $s$ of the bearings, so that they may be readily attached, either to the bar or to the axle, and the beams are provided with holes at $a^2$ $a^3$, to receive the bolts holding the forward ends of the handles, for the purpose of adapting the implement to be converted into a riding or a walking cultivator.

K, Fig. 5, represents a cultivator-mold, the upper part of which is concave, as shown by the sectional view on line Z, and the upper part of the beveled point is straight, as shown by the sectional view on line Y. It has been found by actual experiment that a mold thus constructed will clear itself much better than molds of the usual shape.

In moving or turning the cultivator, the beams are raised and supported by the lever $e$ and bar F, when they are attached for use as a riding-cultivator, as shown in Fig. 1; and when adjusted for use as a walking-cultivator, as shown in Fig. 2, the beams, when raised, are supported by the cross-bar H.

What I claim as new, and desire to secure by Letters Patent, is—

1. The devices for connecting the beams to the cultivator, consisting of the combination of sockets $a$, pivoted to the front ends of the beams, the round bolts $b$, having heads at the lower ends, the single bearings c, having lugs s and semicircular grooves, and fastened by the eyebolts c', which eyebolts hold in place, also, the connecting-bolts b, substantially as described.

2. The cultivator-mold K, having the upper part of the mold concave, and the upper part of the beveled point straight, substantially as and for the purposes described.

In testimony that I claim the foregoing as my own invention I affix my signature in presence of two witnesses.

HENRY P. KYNETT.

Witnesses:
W. W. WILSON,
U. D. RUNKLE.